United States Patent [19]
Sano et al.

[11] Patent Number: 6,139,917
[45] Date of Patent: Oct. 31, 2000

[54] LIQUID CRYSTAL ALIGNING AGENT

[75] Inventors: Syunichi Sano; Kiyoshi Sawahata; Hiroyoshi Fukuro, all of Chiba, Japan

[73] Assignee: Nissan Chemical Industries, Ltd., Tokyo, Japan

[21] Appl. No.: 09/341,118

[22] PCT Filed: Jan. 9, 1998

[86] PCT No.: PCT/JP98/00062

§ 371 Date: Jul. 8, 1999

§ 102(e) Date: Jul. 8, 1999

[87] PCT Pub. No.: WO98/30933

PCT Pub. Date: Jul. 16, 1998

[30] Foreign Application Priority Data

Jan. 10, 1997 [JP] Japan .................................. 9-002675

[51] Int. Cl.$^7$ ................................. G02F 1/1337
[52] U.S. Cl. .................. 427/385.5; 427/108; 427/240; 427/355; 427/389.7; 427/428; 525/432; 525/436; 252/299.01; 252/299.04
[58] Field of Search .................... 525/432, 436; 427/385.5, 108, 240, 355, 389.7, 428; 252/299.01, 299.4

[56] References Cited

U.S. PATENT DOCUMENTS 5,916,632  6/1999  Mishina et al. .................... 427/240

FOREIGN PATENT DOCUMENTS

| 0 337 355 | 10/1989 | European Pat. Off. . |
| 0 527 439 | 2/1993 | European Pat. Off. . |
| 0 540 829 | 5/1993 | European Pat. Off. . |
| 64-4720 | 1/1989 | Japan . |
| 9-185064 | 7/1997 | Japan . |

OTHER PUBLICATIONS

Patent Abstract of Japan, vol. 013, No. 464 (p–947), Oct. 20, 1989, JP 01 180519, Jul. 18, 1989.
Patent Abstract of Japan, vol. 017, No. 105 (P–1495), Mar. 3, 1993, JP 04 294327, Oct. 19, 1992.

*Primary Examiner*—Ana Woodward
*Attorney, Agent, or Firm*—Oblon, Spivak, McClelland, Maier & Neustadt, P.C.

[57] ABSTRACT

A treating agent for liquid crystal alignment, which comprises a polyimide precursor containing repeating units of the formula (1) and having a polymerization degree of from 0.05 to 5.0 dl/g as calculated as the reduced viscosity (in N-methylpyrrolidone at a temperature of 30° C. at a concentration of 0.5 g/dl), and a solvent-soluble polyimide containing repeating units of the formula (2) and having a polymerization degree of from 0.05 to 5.0 dl/g as calculated as the reduced viscosity (in N-methylpyrrolidone at a temperature of 30° C. at a concentration of 0.5 g/dl):

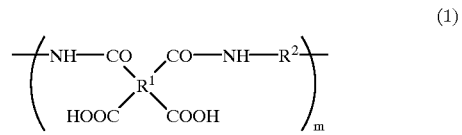

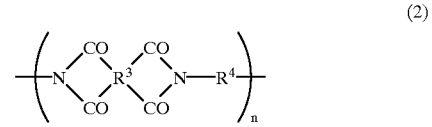

wherein each of $R^1$ and $R^3$ is a tetravalent organic group constituting a tetracarboxylic acid or its derivative, $R^2$ is a bivalent organic group constituting a diamine, $R^4$ is a bivalent organic group constituting a diamine having no fluorine-containing alkyl group or no long chain alkyl group having at least 6 carbon atoms, and each of m and n is a positive integer.

9 Claims, No Drawings

LIQUID CRYSTAL ALIGNING AGENT

TECHNICAL FIELD

The present invention relates to a treating agent for liquid crystal alignment useful for liquid crystal devices such as a liquid crystal display. More particularly, it relates to a treating agent for liquid crystal alignment, which is capable of providing a liquid crystal alignment film which presents a very low tilt angle to a substrate of liquid crystal molecules and is excellent in the electrical properties of liquid crystal devices such as the voltage holding ratio and the charge-accumulation property.

BACKGROUND ART

In recent years, active matrix operation systems using, for example, a thin-layer transistor, have been actively developed by virtue of their excellent display performance. Among them, a so-called TFT display system is the most representative system, and a further improvement in the display performance has been made. Accordingly, also with respect to requirements for a liquid crystal alignment film, it has now been required to improve various properties at the same time. As the liquid crystal alignment film properties usually required for a so-called TFT display system, the tilt angle of liquid crystal molecules, the voltage holding ratio and the charge-accumulation property by a direct current voltage are, for example, the most basic required properties. An alignment film material satisfying all of these properties has been desired. Namely, a treating agent for liquid crystal alignment has been desired which provides a liquid crystal alignment film presenting a relatively high tilt angle of at least a few degrees and having a high voltage holding ratio and a sufficiently low charge-accumulation by a direct current voltage.

As an example of such a treating agent for liquid crystal alignment, one disclosed in JP-A-8-220541 may be mentioned.

However, in order to develop new liquid crystal display devices of recent years or to improve the performance, a treating agent for alignment has also been required which provides a liquid crystal alignment film presenting a tilt angle of liquid crystal molecules as low as at most 2° and having a high voltage holding ratio and a sufficiently low charge-accumulation property by direct current voltage.

In this connection, a material showing a low tilt angle and a high voltage holding ratio has heretofore been found. However, one having a tilt angle of at most 2° has not necessarily been satisfactory with respect to the very low charge-accumulation property.

Namely, with conventional treating agents for liquid crystal alignment, it has been common to improve the film properties by employing one type of a polyimide or a polyimide precursor and selecting its structure variously. It is known that all these properties are affected by the structure of the polyimide to be used, and in fact, it has not been accomplished to fully satisfy all the properties by one polymer structure as an alignment film. Further, with conventional treating agents for alignment, for example, one can show an excellent property for the voltage holding ratio, but has a large charge accumulation, and another is excellent in the voltage holding ratio and the charge-accumulation property, but has a large tilt angle. Thus, no material has been found which satisfies these three properties adequately at the same time. Further, for the practical mass production of liquid crystal devices, not only the above basic properties but also various properties such as adhesive properties to a substrate, printing properties and rubbing resistance are required.

It has been required to develop various properties including productivity as well as the above-mentioned basic properties, and in fact, adequate performance has not necessarily been obtained only by a single polyimide resin.

Conventional treating agents for liquid crystal alignment are generally, for example, the one obtained by coating a varnish having a solvent-soluble polyimide dissolved in a solvent on a substrate, and baking it to form a polyimide film, and then subjecting it to rubbing treatment to obtain a liquid crystal alignment film, or the one obtained by coating a polyimide precursor solution on a substrate, and baking it usually at a temperature of at least 150° C. for imide-modification to form a polyimide film, and then subjecting it to rubbing treatment to obtain a liquid crystal alignment film.

Here, the liquid crystal alignment film formed by a solvent-soluble polyimide is known to have a problem that even with one having a low tilt angle of at most 2°, the thermal stability is inadequate, or even with one having a constant low tilt angle and an excellent voltage holding ratio, the charge-accumulation property is not adequately low. Further, it is known to be usually poor in the adhesive properties to a substrate or in the printing properties.

On the other hand, the one employing a polyimide precursor has advantages that a high and more stable tilt angle can be obtained and the charge-accumulation property can be made small, or advantages that the adhesive properties to a substrate and the printing properties are excellent. However, on the other hand, it has had drawbacks that it is difficult to obtain an adequately low tilt angle, the voltage holding ratio is poor in many cases, the properties tend to depend on the baking temperature, and if the imide-modification degree is not sufficient, the solvent resistance of the film surface is poor.

Namely, both the solvent-soluble polyimide and the polyimide precursor have advantages and disadvantages contrary to each other as a liquid crystal alignment film. Accordingly, it is not necessarily easy to satisfy all the properties required for an alignment film for a so-called TFT.

As mentioned above, in order to improve the performance of new liquid display devices or conventional devices, an excellent treating agent for liquid crystal alignment has been desired which provides a constant low tilt angle of at most 2° and which satisfies properties such as a high voltage holding ratio and a very low charge-accumulation property, at the same time.

Namely, the object of the present invention is to present a treating agent for liquid crystal alignment excellent in these properties.

DISCLOSURE OF THE INVENTION

In order to solve the above problems, the present inventors have conducted an intensive study on treating agents for liquid crystal alignment to be used for forming liquid alignment films by coating them on substrates provided with transparent electrodes, baking them and applying alignment treatment such as rubbing treatment to the film surface, and have accomplished the present invention. Namely, the present invention provides a treating agent for liquid crystal alignment, which comprises a polyimide precursor containing repeating units of the formula (1):

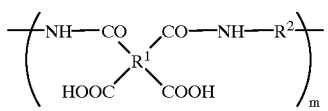

(1)

wherein $R^1$ is a tetravalent organic group constituting a tetracarboxylic acid or its derivative, $R^2$ is a bivalent organic group constituting a diamine, and m is a positive integer, and having a polymerization degree of from 0.05 to 5.0 dl/g as calculated as the reduced viscosity (in N-methylpyrrolidone at a temperature of 30° C. at a concentration of 0.5 g/dl), and a solvent-soluble polyimide containing repeating units of the formula (2):

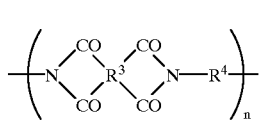

(2)

wherein $R^3$ is a tetravalent organic group constituting a tetracarboxylic acid or its derivative, $R^4$ is a bivalent organic group constituting a diamine having no fluorine-containing alkyl group or no long chain alkyl group having at least 6 carbon atoms, and n is a positive integer, and having a polymerization degree of from 0.05 to 5.0 dl/g as calculated as the reduced viscosity (in N-methylpyrrolidone at a temperature of 30° C. at a concentration of 0.5 g/dl), wherein the solvent-soluble polyimide of the formula (2) is contained in an amount of from 1 to 80 wt % based on the total polymer weight.

BEST MODE FOR CARRYING OUT THE INVENTION

Now, the present invention will be described in detail.

The treating agent for liquid crystal alignment of the present invention is coated on a substrate provided with transparent electrodes, and dried and baked to form a polyimide film, and then the film surface is subjected to alignment treatment such as rubbing treatment to prepare a liquid crystal alignment film.

The treating agent for liquid crystal alignment of the present invention is characterized in that it comprises a polyimide precursor of the above formula (1) and a solvent-soluble polyimide of the formula (2).

Here, the polyimide precursor of the formula (1) can be obtained by reacting and polymerizing a tetracarboxylic acid and its derivative with a diamine in a polar solvent.

As specific examples of the tetracarboxylic acid and its derivative of the formula (1), the following may be mentioned.

Aromatic tetracarboxylic acids such as pyromellitic acid, benzophenone tetracarboxylic acid, biphenyl tetracarboxylic acid and naphthalene tetracarboxylic acid, and their dianhydrides as well as their dicarboxylic acid diacid halides; alicyclic tetracarboxylic acids such as cyclobutane tetracarboxylic acid, cyclopentane tetracarboxylic acid, cyclohexane tetracarboxylic acid and 3,4-dicarboxy-1,2,3,4-tetrahydro-1-haphthalene succinic acid, and their dianhydrides as well as their dicarboxylic acid diacid halides; aliphatic tetracarboxylic acids such as butane tetracarboxylic acid, and their dianhydrides as well as their dicarboxylic acid diacid halides.

Further, these tetracarboxylic acids and their derivatives may be used alone or in combination as a mixture of two or more of them. Especially when two or more of the above-mentioned tetracarboxylic acids are employed, in order to improve the charge-accumulation property, the polyimide precursor of the formula (1) is preferably such that $R^1$ in the formula (1) as a constituting monomer for the copolymer is a tetravalent organic group constituting an aromatic tetracarboxylic acid or its derivative. The proportion of the monomer component having a tetravalent organic group constituting the aromatic tetracarboxylic acid or its derivative is not particularly limited, but it is preferably at least 30 mol % of the total components of tetracarboxylic acids and their derivatives.

As specific examples of the diamine of the formula (1), the following may be mentioned. However, it should be understood that the present invention is by no means restricted to such specific examples.

Specific examples of the diamine include aromatic diamines such as p-phenylenediamine, 1,4-bis(4-aminophenyl)benzene, 4,4'-diaminobiphenyl, 3,3'-dimethyl-4,4'-diaminobiphenyl, 3,3'-dimethoxy-4,4'-diaminobiphenyl, 3,3'-dihydroxy-4,4'-diaminobiphenyl, 3,3'-dichloro-4,4'-diaminobiphenyl, 3,3'-dicarboxy-4,4'-diaminobiphenyl, 4,4'-bis(4-aminophenoxy)biphenyl diaminodiphenylmethane, diaminodiphenyl ether, 2,2-diaminodiphenylpropane, 4,4'-diaminodiphenylsulfone, diaminobenzophenone, 1,3-bis(4-aminophenoxy)benzene, 1,4-bis(4-aminophenoxy)benzene, 4,4'-di(4-aminophenoxy) diphenylsulfone, 2,2-bis[4-(4-aminophenoxy)phenyl] propane and 1,1,1,3,3,3-hexafluoro-2,2-bis[4-(4-aminophenoxy)phenyl]propane; alicyclic diamines such as diaminodicyclohexylmethane, diaminodicyclohexyl ether and diaminocyclohexane; and aliphatic diamines such as 1,2-diaminoethane, 1,3-diaminopropane, 1,4-diaminobutane and 1,6-diaminohexane. Further, a diaminosiloxane of the following formula:

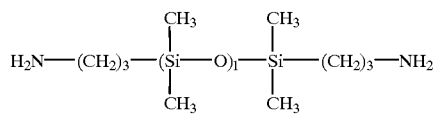

wherein l is an integer of from 1 to 10, may further be mentioned.

Further, in order to obtain a low tilt angle, it is preferred that such a diamine does not have a fluorine-containing alkyl group or a long alkyl group having at least 6 carbon atoms. Further, these diamines can be used alone or in combination as a mixture of two or more of them.

The tetracarboxylic acid or its derivative is reacted and polymerized with the diamine to obtain a polyimide precursor, and as the tetracarboxylic acid derivative to be used here, it is common to employ a tetracarboxylic dianhydride. The molar ratio of the tetracarboxylic acid or its derivative to the diamine is preferably from 0.8 to 1.2. The closer to 1 the molar ratio is, the larger the polymerization degree of the produced polymer is, like in conventional polycondensation reactions.

If the polymerization degree is too small, the strength of the polyimide coating film tends to be inadequate, and if the polymerization degree is too large, the operation efficiency at the time of forming the polyimide coating film sometimes tends to be poor. Accordingly, the polymerization degree of the product in this reaction is preferably from 0.05 to 5.0 dl/g (as measured in N-methylpyrrolidone at a temperature of 30° C. and at a concentration of 0.5 g/dl) in terms of a reduced viscosity in the polyimide precursor solution.

The method for reacting and polymerizing the tetracarboxylic acid or its derivative and diamine is not particularly limited. However, a conventional solution polymerization is suitable as a polymerization method for the polyimide precursor. Usually, the tetracarboxylic dianhydride and the diamine are reacted in an organic polar solvent such as N-methylpyrrolidone to prepare a polyimide precursor. Here, the reaction temperature is suitably selected from −20° C. to 150° C., preferably from −5° C. to 100° C.

Further, specific examples of the solvent to be used for the solution polymerization method include N,N-dimethylformamide, N,N-dimethylacetamide, N-methyl-2pyrrolidone, N-methylcaprolactam, dimethylsulfoxide, tetramethylurea, pyridine, dimethylsulfone, hexamethylphosphoramide and butyl lactone. These solvents may be used alone or in combination as a mixture. Further, a solvent which does not dissolve the polyimide precursor, may be added to the above solvent in an amount within such a range that a uniform solution can still be obtained.

The method for obtaining the organic solvent-soluble polyimide resin having the repeating units of the formula (2) of the present invention, is not particularly limited. However, it can usually be obtained by reacting and polymerizing a tetracarboxylic acid or its derivative and a diamine to prepare a polyimide precursor, followed by dehydration ring-closure for imide-modification.

The tetracarboxylic acid or its derivative constituting $R^3$ of the formula (2), is not particularly limited so long as it does not impair the solubility of the resulting polyimide resin in an organic solvent. As specific examples thereof, the following may be mentioned, but the present invention is by no means restricted thereto. They include aromatic tetracarboxylic acids such as pyromellitic acid, benzophenone tetracarboxylic acid, biphenyl tetracarboxylic acid and naphthalene tetracarboxylic acid, and their dianhydrides as well as their dicarboxylic acid diacid halides; alicyclic tetracarboxylic acids such as cyclobutane tetracarboxylic acid, cyclopentane tetracarboxylic acid, cyclohexane tetracarboxylic acid and 3,4-dicarboxy-1,2,3,4-tetrahydro-1-naphthalene succinic acid, and their dianhydrides as well as their dicarboxylic acid diacid halides; and aliphatic tetracarboxylic acids such as butane tetracarboxylic acid, and their dianhydrides as well as their dicarboxylic acid diacid halides.

Further, these tetracarboxylic acids and their derivatives may be used alone or in combination as a mixture of two or more of them. Among the above-mentioned tetracarboxylic acids and their derivatives, it is particularly preferred to use 3,4-dicarboxy-1,2,3,4-tetrahydro-1-naphthalenesuccinic acid or its derivative, with a view to increasing the voltage holding ratio.

Specific examples of the diamine which constitutes the solvent-soluble polyimide of the formula (2) are not particularly limited so long as they do not impair the solubility of the resulting polyimide resin in an organic solvent. As specific examples thereof, the following may be mentioned. They include aromatic diamines such as p-phenylenediamine, 1,4-bis(4-aminophenyl)benzene, 4,4-diaminobiphenyl, 3,3'-dimethyl-4,4'-diaminobiphenyl, 3,3'-dimethoxy-4,4'-diaminobiphenyl, 3,3-dihydroxy-4,4'-diaminobiphenyl, 3,3'-dichloro-4,4'-diaminobiphenyl, 3,3'-dicarboxy-4,4'-diaminobiphenyl, 4,4'-bis(4-aminophenoxy)biphenyl, diaminodiphenylmethane, diaminodiphenyl ether, 2,2-diaminodiphenylpropane, 4,4'-diaminodiphenylsulfone, diaminobenzophenone, 1,3-bis(4-aminophenoxy)benzene, 1,4-bis(4-aminophenoxy)benzene, 4,4'-di(4-aminophenoxy)diphenylsulfone and 2,2-bis[4-(4-aminophenoxy)phenyl]propane; alicyclic diamines such as diaminodicyclohexylmethane, diaminodicyclohexyl ether and diaminocyclohexane; and aliphatic diamines such as 1,2-diaminoethane, 1,3-diaminopropane, 1,4-diaminobutane and 1,6-diaminohexane. Further, a diaminosiloxane of the following formula:

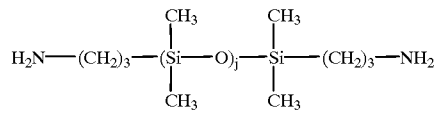

wherein j is an integer of from 1 to 10, may further be mentioned.

Further, these diamines may be used alone or in combination as a mixture of two or more of them.

The present invention is not limited to such diamines, but preferably, p-phenylenediamine, 1,4-bis(4-aminophenyl)benzene, 4,4'-diaminobiphenyl, 3,3'-dimethyl-4,4'-diaminobiphenyl, 3,3'-dimethoxy-4,4'-diaminobiphenyl, 3,3'-dihydroxy-4,4'-diaminobiphenyl, 3,3'-dichloro-4,4'-diaminobiphenyl, 3,3'-dicarboxy-4,4'-diaminobiphenyl or 4,4'-bis(4-aminophenoxy)biphenyl, may be mentioned.

Further, in order to obtain a low tilt angle, it is necessary that the diamine constituting the solvent-soluble polyimide of the formula (2) does not contain a fluorine-containing alkyl group or a long chain alkyl group having at least 6 carbon atoms. If it contains such a long chain group, a sufficiently low tilt angle may not usually be obtained, such being undesirable. Therefore, for example, the treating agent for liquid crystal alignment disclosed in e.g. JP-A-8-220541 is not desirable for the purpose of solving the problem of the present invention, since the tilt angle will be high. It is particularly preferred to introduce a structure of low polarity such as the above-mentioned diaminosiloxane, as a diamine constituting the solvent-soluble polyimide of the formula (2) in order to obtain the effect of the present invention sufficiently.

The method for producing the solvent-soluble polyimide resin of the present invention is not particularly limited. As a polymerization method for a polyimide resin, a solution method is usually suitable. It is usually possible to employ a method wherein the tetracarboxylic or its derivative and the diamine are reacted and polymerized in an organic solvent in a molar ratio within a range of from 0.8 to 1.2 to obtain a polyimide resin precursor having a reduced viscosity of from 0.05 to 5.0 dl/g (in N-methyl-2-pyrrolidone at a temperature of 30° C. at a concentration of 0.5 g/dl), followed by dehydration ring closure to obtain a polyimide resin.

The temperature for reacting and polymerizing the tetracarboxylic acid or its derivative and the diamine is suitably selected from −20 to 150° C., preferably from −5 to 100° C. Specific examples of the solvent to be used for the solution polymerization method include N,N-dimethylformamide, N,N-dimethylacetamide, N-methyl-2-pyrrolidone, N-methylcaprolactam, dimethylsulfoxide, tetramethylurea, pyridine, dimethylsulfone, hexamethylphosphoramide and butyl lactone.

Since the polyimide resin of the formula (2) is soluble in a solvent, the polyimide precursor obtained by reacting the tetracarboxylic acid or its derivative and the diamine, may be imide-modified as it is in a solution to obtain a solvent-soluble polyimide solution.

To convert the polyimide precursor to the polyimide, a method of heating for dehydration ring-closure is usually employed. The heating temperature for dehydration ring-closure can be selected optionally within a range of from 100° C. to 350° C., preferably from 120° C. to 250° C.

Further, as another method for converting the polyimide precursor to the polyimide, a method may be employed wherein a conventional catalyst for dehydration ring-closure is used for chemical ring-closure.

The polyimide solution thus obtained may be used as it is, or it may be precipitated in a poor solvent such as methanol or ethanol, and isolated, so that the polyimide may be used in the form of a powder, or the polyimide powder may be re-dissolved in a proper solvent for use. The solvent for re-dissolving it, is not particularly limited so long as it is capable of dissolving the obtained polyimide resin. It may, for example, be 2-pyrrolidone, N-methylpyrrolidone, N-ethylpyrrolidone, N-vinylpyrrolidone, N,N-dimethylacetamide, N,N-dimethylformamide or γ-butyrolactone.

To obtain the treating agent for liquid crystal alignment of the present invention which contains the polyimide precursor of the formula (1) and the solvent-soluble polyimide of the formula (2), the polyimide precursor of the formula (1) and the solvent-soluble polyimide of the formula (2) are dissolved in a solvent so that the proportion of the solvent-soluble polyimide of the formula (2) is from 1 to 80% by weight based on the total polymer weight of the polyimide precursor of the formula (1) and the solvent-soluble polyimide of the formula (2).

The mixing proportion of the solvent-soluble polyimide of the formula (2) to the polyimide precursor of the formula (1) can optionally be selected within the above range to control the properties of the liquid crystal such as the tilt angle, etc. When the proportion of the solvent-soluble polyimide of the formula (2) exceeds 80 wt % to the total polymer weight, or less than 1 wt %, the effects of the present invention may not sometimes be sufficiently obtainable, such being undesirable.

At this time, as a method for incorporating the polyimide of the formula (2) into the polyimide precursor solution of the formula (1), methods may be mentioned wherein a polyimide powder is directly incorporated or a solution having a polyimide dissolved in an organic solvent is incorporated. There is no particular limitation in the method of incorporation.

The solvent used for the composition of the present invention, is not particularly limited so long as it is capable of dissolving the polyimide resin. It may, for example, be 2-pyrrolidone, N-methylpyrrolidone, N-ethylpyrrolidone, N-vinylpyrrolidone, N,N-dimethylacetamide, N,N-dimethylformamide or γ-butyrolactone.

In addition, even a solvent which is incapable of dissolving the polyimide by itself, may be added to the above solvent within a range not to impair the solubility.

Such a solvent may, for example, be ethyl cellosolve, butyl cellosolve, ethyl carbitol, butyl carbitol, ethyl carbitol acetate or ethylene glycol.

Further, propylene glycol derivatives such as 1-methoxy-2-butoxy-propanol, and lactic acid derivatives such as methyl lactate, as disclosed in JP-A-7-109,438 and JP-A-7-228,839, may be used.

Further, for the purpose of further improving the adhesive property between the polyimide resin film and the substrate, additives such as a coupling agent may be added to the resulting resin solution.

The composition for the treating agent for liquid crystal alignment of the present invention may be coated on a transparent substrate such as a glass or plastic substrate provided with transparent electrodes and baked to form a polyimide film, and then the film surface is subjected to alignment treatment such as rubbing treatment, to obtain a liquid crystal alignment film.

Here, the coating method is not particularly limited, and a conventional method may be employed. It is usual to employ, for example, spin coating, roll coating, offset printing or gravure printing.

The temperature for heat treatment to form the polyimide coating film can be selected optionally within a range of from 50 to 400° C., preferably from 100 to 300° C.

Now, preferred embodiments of the present invention will be described.

(1) A treating agent for liquid crystal alignment comprising a polyimide precursor containing repeating units of the formula (1):

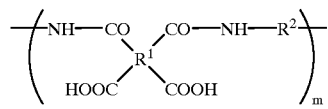

wherein $R^1$ is a tetravalent organic group constituting a tetracarboxylic acid or its derivative, $R^2$ is a bivalent organic group constituting a diamine, and m is a positive integer, and having a polymerization degree of from 0.05 to 5.0 dl/g as calculated as the reduced viscosity (in N-methylpyrrolidone at a temperature of 30° C. at a concentration of 0.5 g/dl), and a solvent-soluble polyimide resin containing repeating units of the formula (2):

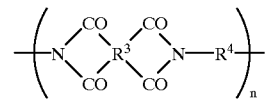

wherein $R^3$ is a tetravalent organic group constituting a tetracarboxylic acid or its derivative, $R^4$ is a bivalent organic group constituting a diamine having no fluorine-containing alkyl group or no long chain alkyl group having at least 6 carbon atoms, and n is a positive integer, and having a polymerization degree of from 0.05 to 5.0 dl/g as calculated as the reduced viscosity (in N-methylpyrrolidone at a temperature of 30° C. at a concentration of 0.5 g/dl), wherein the solvent-soluble polyimide of the formula (2) is contained in an amount of from 1 to 80 wt % based on the total polymer weight.

(2) The treating agent for liquid crystal alignment according to the present invention or the embodiment (1), wherein $R^2$ of the polyimide precursor of the formula (1) is a bivalent organic group constituting a diamine having no fluorine-containing alkyl group or no long chain alkyl group having at least 6 carbon atoms.

(3) The treating agent for liquid crystal alignment according to the present invention or the embodiment (1) or (2), wherein the polyimide precursor of the formula (1) is a copolymer wherein $R^1$ in the formula (1) is at least two types of tetravalent organic groups constituting tetracarboxylic acids or their derivatives, and as at least one type of the constituting monomer component for the copolymer, $R^1$ is a tetravalent organic group constituting an aromatic tetracarboxylic acid or its derivative.

(4) The treating agent for liquid crystal alignment according to the present invention or any one of the embodiments (1)

to (3), wherein $R^3$ of the solvent-soluble polyimide of the formula (2) is a tetravalent organic group constituting 3,4-dicarboxy-1,2,3,4-tetrahydro-1-naphthalene succinic acid or its derivative.

Now, the present invention will be described in further detail with reference to Examples, but the present invention is by no means restricted to them.

EXAMPLE 1

20.02 g (0.1 mol) of 4,4'-diaminodiphenyl ether was dissolved in 230 g of N-methylpyrrolidone (NMP), and 19.60 g (0.1 mol) of cyclobutane tetracarboxylic dianhydride was added thereto and reacted at room temperature for 4 hours to obtain a polyimide precursor having a reduced viscosity of 1.0 dl/g (in N-methyl-2pyrrolidone at a temperature of 30° C. and a concentration of 0.5 g/dl). This solution was diluted with NMP to a solid content concentration of 6% to obtain a polyimide precursor solution (A-1).

30.03 g (0.1 mol) of 3,4-dicarboxy-1,2,3,4-tetrahydro-1-naphthalene succinic dianhydride (hereinafter referred to simply as TDA) and 19.83 g (0.1 mol) of 4,4'-diaminodiphenylmethane were reacted in 283 g of NMP at 10° C. for 20 hours to prepare a polyimide precursor solution.

Into 50 g of this polyimide precursor solution, 15.3 g of acetic anhydride and 7.1 g of pyridine were added as imide-modification catalysts, followed by a reaction at 40° C. and 80° C. for 1 hour each, to prepare a polyimide resin solution. This solution was put into 550 ml of methanol, and white precipitates thereby obtained, were collected by filtration and dried to obtain a white polyimide resin powder. The reduced viscosity ηsp/c of the obtained polyimide resin was 0.43 dl/g (0.5 wt % NMP solution, 30° C.).

0.6 g of this powder was dissolved in 9.4 g of γ-butyrolactone to obtain a solvent-soluble polyimide resin solution (B-1) having a solid content concentration of 6%.

Then, the polyimide precursor solution (A-1) and the solvent-soluble polyimide resin solution (B-1) were mixed in a weight ratio of (A-1)/(B-1)=4/1, diluted with NMP and thoroughly stirred to obtain a uniform solution having a total solid content concentration of 4%. This solution was spin-coated at 3700 rpm on a glass substrate provided with transparent electrodes, and then baked at 180° C. for 60 minutes to obtain a polyimide film having a film thickness of 1000 Å.

This coating film was rubbed with a cloth, and fabrication was conducted so that the rubbing directions would be opposite and in parallel while interposing a spacer of 50μ, and then liquid crystal (ZLI-4792 manufactured by Merck Co.) was injected to prepare a liquid crystal cell.

The alignment state of this liquid crystal cell was observed by a polarization microscope to confirm a uniform alignment without defects. Further, with respect to this cell, the tilt angle of liquid crystal was measured by a crystal rotation method and found to be 1.2°, and thus it had a sufficiently low tilt angle.

Further, the tilt angle after heating at 120° C. for 60 minutes after injection of the liquid crystal, was 1.2°, and thus no change due to the heat treatment was observed.

Then, to measure electrical properties of the liquid crystal cell, using a substrate having a polyimide film formed and rubbed in the same manner as above, a spacer of 6μ was sprayed on the film surface, then fabrication was conducted so that the rubbing directions would be substantially at right angles, and liquid crystal (MLC-2003, manufactured by Merck Co.) was injected to prepare a 90° twist liquid crystal cell. The alignment state of this liquid crystal cell was inspected by a polarization microscope to confirm a uniform alignment without defects.

With respect to this liquid crystal cell, the voltage holding ratio was measured and found to show high values of 98% at 23° C. and 80% at 90° C. Further, rectangular waves of 30 Hz/±3 V having a direct current of 3 V superimposed thereon were applied to this cell at 23° C. for 60 minutes. Immediately after the direct current of 3 V was cut off after 60 minutes, the residual voltage remaining in the liquid crystal cell was measured by an optical flicker elimination method and found to be 0.1 V. Thus, the charge-accumulation was small.

EXAMPLE 2

20.02 g (0.1 mol) of 4,4'-diaminodiphenyl ether was dissolved in 230 g of N-methylpyrrolidone (NMP), and 9.80 g (0.05 mol) of cyclobutane tetracarboxylic dianhydride and 10.90 g (0.05 mol) of pyromellitic dianhydride were added thereto and reacted at room temperature for 4 hours, to obtain a polyimide precursor having a reduced viscosity of 0.9 dl/g (in N-methyl-2-pyrrolidone at a temperature of 30° C. at a concentration of 0.5 g/dl). This solution was diluted with NMP to a solid content concentration of 6% to obtain a polyimide precursor solution (A-2).

Then, the polyimide precursor solution (A-2) and the solvent-soluble polyimide resin solution (B-1) obtained in Example 1, were mixed in a weight ratio of (A-2)/(B-1)=4/1, diluted with NMP and thoroughly stirred to obtain a uniform solution having a total solid content concentration of 4%. This solution was spin-coated at 3000 rpm on a glass substrate provided with transparent electrodes and baked at 180° C. for 60 minutes to obtain a polyimide film having a film thickness of 1000 Å.

This coating film was rubbed with a cloth, and fabrication was conducted so that the rubbing directions would be opposite and in parallel while interposing a spacer of 50μ, and then liquid crystal (ZLI-4792 manufactured by Merck Co.) was injected to prepare a liquid crystal cell.

The alignment state of this liquid crystal cell was observed by a polarization microscope to confirm a uniform alignment without defects. Further, with respect to this cell, the tilt angle of liquid crystal was measured by a crystal rotation method and found to be 1.0°, and thus it had a sufficiently low tilt angle.

Further, the tilt angle after heating at 120° C. for 60 minutes after the injection of liquid crystal, was 1.1°, and thus, the change due to the heat treatment was small and stable.

Then, to measure electrical properties of the liquid crystal cell, using a substrate having a polyimide film formed and rubbed in the same manner as above, a spacer of 6μ was sprayed on the film surface, then fabrication was conducted so that the rubbing directions would be substantially at right angles, and liquid crystal (MLC-2003, manufactured by Merck Co.) was injected to prepare a 90° twist liquid crystal cell. The alignment state of this liquid crystal cell was inspected by a polarization microscope to confirm a uniform alignment without defects.

With respect to this liquid crystal cell, the voltage holding ratio was measured and found to show high values of 98% at 23° C. and 80% at 90° C. Further, rectangular waves of 30 Hz/±3 V having a direct current of 3 V superimposed thereon were applied to this cell at 23° C. for 60 minutes. Immediately after the direct current of 3 V was cut off after 60 minutes, the residual voltage remaining in the liquid crystal cell was measured by an optical flicker elimination method and found to be 0.1 V. Thus the charge accumulation was small.

EXAMPLE 3

The polyimide precursor solution (A-2) prepared in Example 2 and the solvent-soluble polyimide resin solution (B-1) prepared in the same manner as in Example 1, were mixed in a weight ratio of (A-2)/(B-1)=1/4, then diluted with NMP and thoroughly stirred to obtain a uniform solution having a total solid content concentration of 4%. This solution was spin-coated at 2600 rpm on a glass substrate provided with transparent electrodes and baked at 180° C. for 60 minutes to obtain a polyimide film having a film thickness of 1000 Å.

Then, a liquid crystal cell was prepared in the same manner as in Example 2.

The alignment state of this liquid crystal cell was inspected by a polarization microscope to confirm a uniform alignment without defects. Further, with respect to this cell, the tilt angle of liquid crystal was measured by a crystal rotation method and found to be 1.1°, and thus it had a sufficiently low tilt angle. Further, the tilt angle after heating at 120° C. for 60 minutes after the injection of liquid crystal, was 1.1°, and thus no change due to the heat treatment was observed. Further, in the same manner as in Example 1, the voltage holding ratio was measured and found to show high values of 98% at 23° C. and 85% at 90° C. Further, the residual voltage remaining in the liquid crystal cell was measured and found to be 0.3 V. Thus, the charge accumulation was small.

EXAMPLE 4

20.02 g (0.1 mol) of 4,4'-diaminodiphenyl ether was dissolved in 237 g of N-methylpyrrolidone (NMP), and 21.4 g (0.1 mol) of pyromellitic dianhydride was added thereto and reacted at room temperature for 4 hours, to obtain a polyimide precursor having a reduced viscosity of 1.0 dl/g (in N-methyl-2-pyrrolidone at a temperature of 30° C. at a concentration of 0.5 g/dl). This solution was diluted with NMP to a solid content concentration of 6% to obtain a polyimide precursor solution (A-3).

Then, using the solvent-soluble polyimide resin solution (B-1) prepared in the same manner as in Example 1, the polyimide precursor solution (A-3) and the solvent-soluble polyimide resin solution (B-1) were mixed in a weight ratio of (A-3)/(B-1)=4/1, diluted with NMP and thoroughly stirred to obtain a uniform solution having a total solid content concentration of 4%. This solution was spin-coated at 3000 rpm on a glass substrate provided with transparent electrodes and baked at 180° C. for 60 minutes to obtain a polyimide film having a film thickness of 1000 Å.

Then, a liquid crystal cell was prepared in the same manner as in Example 2.

The tilt angle of liquid crystal was 1.0°, and the tilt angle after heating at 120° C. for 60 minutes after the injection of liquid crystal was 1.1°, and thus the change due to the heat treatment was small. Further, the voltage holding ratio showed high values of 97% at 23° C. and 82% at 90° C., and the residual voltage showed an extremely low value of 0.0 V.

EXAMPLE 5

20.02 g (0.1 mol) of 4,4'-diaminodiphenyl ether was dissolved in 170 g of N-methylpyrrolidone (NMP), and 7.84 g (0.08 mol) of cyclobutane tetracarboxylic dianhydride and 2.18 g (0.02 mol) of pyromellitic dianhydride were added thereto and reacted at room temperature for 4 hours, to obtain a polyimide precursor having a reduced viscosity of 1.0 dl/g (in N-methyl-2-pyrrolidone at a temperature of 30° C. at a concentration of 0.5 g/dl). This solution was diluted with NMP to a solid content concentration of 6% to obtain a polyimide precursor solution (A-4).

Then, using the solvent-soluble polyimide resin solution (B-1) prepared in the same manner as in Example 1, the polyimide precursor solution (A-4) and the solvent-soluble polyimide resin solution (B-1) were mixed in a weight ratio of (A-4)/(B-1)=4/1, diluted with NMP and thoroughly stirred to obtain a uniform solution having a total solid content concentration of 4%. This solution was spin-coated at 3000 rpm on a glass substrate provided with transparent electrodes and baked at 180° C. for 60 minutes to obtain a polyimide film having a film thickness of 1000 Å.

Then, a liquid crystal cell was prepared in the same manner as in Example 2. The tilt angle of the liquid crystal was 1,2°, and the tilt angle after heating at 120° C. for 60 minutes after the injection of liquid crystal, was 1.2°, and thus no change due to the heat treatment was observed. Further, the voltage holding ratio showed high values of 97% at 23° C. and 82% at 90° C., and the residual voltage showed a low value of 0.2 V.

EXAMPLE 6

19.83 g (0.1 mol) of 4,4'-diaminodiphenylmethane was dissolved in 228 g of N-methylpyrrolidone (NMP), and 9.80 g (0.05 mol) of cyclobutane tetracarboxylic dianhydride and 10.90 g (0.05 mol) of pyromellitic dianhydride were added thereto and reacted at room temperature for 4 hours, to obtain a polyimide precursor having a reduced viscosity of 0.9 dl/g (in N-methyl-2-pyrrolidone at a temperature of 30° C. at a concentration of 0.5 g/dl). This solution was diluted with NMP to a solid content concentration of 6% to obtain a polyimide precursor solution (A-5).

Then, in the same manner as in Example 2, the polyimide precursor solution (A-5) and the solvent-soluble polyimide resin solution (B-1) were mixed in a weight ratio of (A-5)/(B-1)=4/1, diluted with NMP and thoroughly stirred to obtain a uniform solution having a total solid content concentration of 4%. This solution was spin-coated at 3000 rpm on a glass substrate provided with transparent electrodes and baked at 180° C. for 60 minutes to obtain a polyimide film having a film thickness of 1000 Å.

Then, a liquid crystal cell was prepared in the same manner as in Example 2. The tilt angle of liquid crystal was 1,0°, and the tilt angle after heating at 120° C. for 60 minutes after the injection of liquid crystal, was 1.1°, and thus the change due to the heat treatment was small and stable. Further, the voltage holding ratio showed high values of 98% at 23° C. and 82% at 90° C., and the residual voltage showed a low value of 0.1 V.

EXAMPLE 7

30.03 g (0.1 mol) of 3,4-dicarboxy-1,2,3,4-tetrahydro-1-naphthalenesuccinic dianhydride (hereinafter referred to simply as TDA), 15.86 g (0.08 mol) of 4,4'-diaminodiphenylmethane and 4.97 g (0.02 mol) of 1,3-bis (3-aminopropyl)tetramethyldisiloxane were reacted in 288 g of NMP at 30° C. for 15 hours to prepare a polyimide precursor solution.

To 50 g of this polyimide precursor solution, 15.1 g of acetic anhydride and 7.0 g of pyridine were added as imide-modification catalysts, followed by a reaction at 40° C. for 3 hours, to prepare a polyimide resin solution. This solution was put into 500 ml of methanol, and the obtained white crystals were collected by filtration and dried to obtain a white polyimide resin powder. The reduced viscosity ηsp/c of the obtained polyimide resin was 0.43 dl/g (0.5 wt % NMP solution, 30° C.).

0.6 g of this powder was dissolved in 9.4 g of γ-butyrolactone to obtain a solvent-soluble polyimide resin solution (B-2) having a solid content concentration of 6%.

Then, the polyimide precursor solution (A-5) of Example 6 and the solvent-soluble polyimide resin solution (B-2) were mixed in a weight ratio of (A-5)/(B-2)=4/1, diluted with NMP and thoroughly stirred to obtain a uniform solution having a total solid content concentration of 4%. This solution was spin-coated at 3700 rpm on a glass substrate provided with transparent electrodes and baked at 200° C. for 60 minutes to obtain a polyimide film having a film thickness of 1000 Å.

Then, a liquid crystal cell was prepared in the same manner as in Example 2. The tilt angle of liquid crystal was as low as 1.2°, and further, the tilt angle after heating at 120° C. for 60 minutes after the injection of liquid crystal, was 1.1°, and thus, no change due to the heat treatment was observed. Further, the voltage holding ratio showed high values of 98% at 23° C. and 90% at 90° C., and the residual voltage showed an extremely low value of 0.0 V.

Comparative Example 1

Using only the polyimide precursor solution (A-1) prepared in Example 1, a polyimide film was formed on a glass substrate provided with transparent electrodes, and then a liquid crystal cell was prepared in the same manner as in Example 1.

As a result, the tilt angle of liquid crystal was 2.1° and thus was not sufficiently low. Further, although the residual voltage showed a low value of 0.8 V, the voltage holding ratio was low at a level of 90% at room temperature and 70% at 90° C. Thus, a low charge accumulation property was not obtained at a low tilt angle and voltage holding ratio.

Comparative Example 2

Using only the polyimide precursor solution (A-2) prepared in Example 2, a polyimide film was formed on a glass substrate provided with transparent electrodes, and then a liquid crystal cell was prepared in the same manner as in Example 1.

As a result, the tilt angle of liquid crystal was 2.1° and thus was not sufficiently low. Further, although the residual voltage showed a low value of 0.3 V, the voltage holding ratio was low at a level of 80% at room temperature and 70% at 90° C. Thus, a low charge accumulation property was not obtained at a low tilt angle and voltage holding ratio.

Comparative Example 3

Using only the solvent-soluble polyimide solution (B-1) obtained in Example 1, a polyimide film was formed on a glass substrate provided with transparent electrodes, and then a liquid crystal cell was prepared in the same manner as in Example 1.

As a result, the tilt angle of liquid crystal was as low as 1.0°, and the voltage holding ratio was as high as 99% at room temperature and 90% at 90° C., but the residual voltage showed a high value of 1.0 V, and a low charge accumulation property was not obtained at a low tilt angle and voltage holding ratio.

Comparative Example 4

The polyimide precursor solution (A-3) prepared in Example 4 was diluted with NMP to a solid content concentration of 4% to obtain a polyimide precursor solution (A-6). Using only this polyimide precursor solution, a polyimide film was formed on a glass substrate provided with transparent electrodes, and then a liquid crystal cell was prepared in the same manner as in Example 1.

As a result, the tilt angle of liquid crystal was 2.2° and thus was not sufficiently low. Further, although the residual voltage showed a low value of 0.2 V, the voltage holding ratio was low at a level of 78% at room temperature and 40% at 90° C., and a low charge accumulation property was not obtained at a low tilt angle and voltage holding ratio.

Comparative Example 5

Using only the polyimide precursor solution (A-4) prepared in Example 5, a polyimide film was formed on a glass substrate provided with transparent electrodes, and then a liquid crystal cell was prepared in the same manner as in Example 1.

As a result, the tilt angle of liquid crystal was 2.2° and thus was not sufficiently low. Further, although the residual voltage showed a low value of 0.4 V, the voltage holding ratio was low at a level of 92% at room temperature and 60% at 90° C., and a low charge accumulation property was not obtained at a low tilt angle and voltage holding ratio.

Comparative Example 6

Using only the polyimide precursor solution (A-5) prepared in Example 6, a polyimide film was formed on a glass substrate provided with transparent electrodes, and then a liquid crystal cell was prepared in the same manner as in Example 1.

As a result, the tilt angle of liquid crystal was 2.0° and thus was not sufficiently low. Further, although the residual voltage showed a low value of 0.1 V, the voltage holding ratio was 95% at room temperature and 70% at 90° C., and a low charge accumulation property was not obtained at a low tilt angle and voltage holding ratio.

Comparative Example 7

Using only the solvent-soluble polyimide solution (B-2) prepared in Example 7, a polyimide film was formed on a glass substrate provided with transparent electrodes, and then a liquid crystal cell was prepared in the same manner as in Example 1.

As a result, the tilt angle of liquid crystal was 0.8° and thus was sufficiently low, and the voltage holding ratio was 95% at room temperature and 90% at 90° C., but the residual voltage showed a high value of 1.0 V, and a low charge accumulation property was not obtained at a low tilt angle and voltage holding ratio.

INDUSTRIAL APPLICABILITY

By the treating agent for liquid crystal alignment according to the present invention, it will be made possible to obtain an excellent liquid crystal alignment film whereby the tilt angle of liquid crystal molecules is very low and stable and properties such as an extremely low charge accumulation property and a high voltage holding ratio, can be simultaneously satisfied, and to obtain a liquid crystal device having excellent properties superior to conventional ones.

What is claimed is:

1. A treating agent for liquid crystal alignment, comprising:

(1) a polyimide precursor having a repeating unit of formula (1):

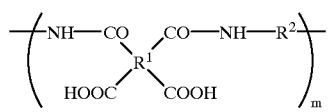

(1)

wherein m is a positive integer;

$R^1$ is a tetravalent organic group derived from at least one tetracarboxylic acid or its derivative selected from the group consisting of pyromellitic acid, benzophenone tetracarboxylic acid, biphenyl tetracarboxylic acid, naphthalene tetracarboxylic acid, cyclobutane tetracarboxylic acid, cyclopentane tetracarboxylic acid, cyclohexane tetracarboxylic acid and 3,4-dicarboxy-1,2,3,4-tetrahydro-1-naphthalene succinic acid;

$R^2$ is a bivalent organic group derived from least one diamine selected from the group consisting of p-phenylene diamine, 1,4-bis(4-aminophenyl) benzene, 4,4'-diaminobiphenyl, 3,3'-dimethyl-4,4'-diaminobiphenyl, 3,3'-dimethoxy-4,4'-diaminobiphenyl, 3,3'-dichloro-4,4'-diaminobiphenyl, 3,3'-dicarboxy-4,4'-diaminobiphenyl, 4,4'-bis(4-aminophenoxy)biphenyl, diaminophenylmethane, diaminodiphenylether, 2,2-diaminodiphenylpropane, 4,4'-diaminodiphenylsulfone, diaminobenzophenone, 1,3-bis(4-aminophenoxy)benzene, 1,4-bis(4-aminophenoxy)benzene, 4,4'-di(4-aminophenoxy)diphenylsulfone, 2,2-bis[4-(4-aminophenoxy)phenyl]propane, 1,1,1,3,3,3-hexafluoro-2,2-bis[4-(4-aminophenoxy)phenyl]propane, diaminodicyclohexylmethane, diaminodicyclohexylether, diaminocyclohexane, 1,2-diaminoethane, 1,3-diaminopropane, 1,4-diaminobutane, 1,6-diaminohexane and the following diaminosiloxane

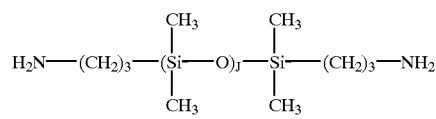

wherein

J=a positive integer from 1 to 10; and wherein said polyimide precursor has a reduced viscosity of 0.05 to 5.0 dl/g as measured in N-methylpyrrolidone at a temperature of 30° C. at a concentration of 0.5 g/dl; and (2) a solvent-soluble polyimide consisting of a repeating unit of formula (2):

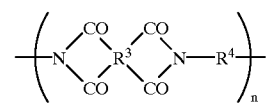

(2)

wherein $R^3$ is a tetravalent organic group derived from 3,4-dicarboxy-1,2,3,4-tetrahydro-1-naphthalene succinic acid;

$R^4$ is a bivalent organic group derived from a diamine without a fluorine-containing alkyl group and without a long chain alkyl group having at least 6 carbon atoms; and n is a positive integer;

wherein said polyimide precursor has a reduced viscosity of 0.05 to 5.0 dl/g as measured in N-methylpyrrolidone at a temperature of 30° C. at a concentration of 0.5 g/dl; and wherein said solvent-soluble polyimide of formula (2) is present in an amount of from 1 to 80% by weight based on the total weight of said treating agent.

2. The treating agent according to claim 1, wherein $R^1$ of formula (1) is a tetravalent organic group derived from cyclobutane tetracarboxylic acid and pyromellitic acid, or their derivatives.

3. The treating agent according to claim 1, wherein $R^1$ is a tetravalent organic group derived from at least one dianhydride selected from the group consisting of a dianhydride of pyromellitic acid, a dianhydride of benzophenone tetracarboxylic acid, a dianhydride of biphenyl tetracarboxylic acid, a dianhydride of naphthalene tetracarboxylic acid, a dianhydride of cyclobutane tetracarboxylic acid, a dianhydride of cyclopentane tetracarboxylic acid, a dianhydride of cyclohexane tetracarboxylic acid and a dianhydride of 3,4-dicarboxy-1,2,3,4-tetrahydro-1-naphthalene succinic acid.

4. The treating agent according to claim 1, wherein $R^1$ is a tetravalent organic group derived from at least one diacid halide selected from the group consisting of a diacid halide of pyromellitic acid, a diacid halide of benzophenone tetracarboxylic acid, a diacid halide of biphenyl tetracarboxylic acid, a diacid halide of naphthalene tetracarboxylic acid, a diacid halide of cyclobutane tetracarboxylic acid, a diacid halide of cyclopentane tetracarboxylic acid, a diacid halide of cyclohexane tetracarboxylic acid and a diacid halide of 3,4-dicarboxy-1,2,3,4-tetrahydro-1-naphthalene succinic acid.

5. The treating agent according to claim 1, wherein said tetracarboxylic acid from which $R^1$ is derived and said diamine from which $R^2$ is derived are present in a molar ratio of 0.8 to 1.2.

6. A method for preparing an alignment coating for liquid crystals, comprising:

coating the treating agent of claim 1 onto a substrate, thereby providing a coated substrate;

drying said coated substrate;

baking said coated substrate to form a polyimide film;

rubbing said polyimide film.

7. The method according to claim 6, wherein said coating is spin coating, roll coating, offset printing, or gravure printing.

8. The method according to claim 6, wherein said baking is performed at a temperature of 50–400° C.

9. The method according to claim 8, wherein said baking is performed at a temperature of 100–300° C.

* * * * *